Figure 1:
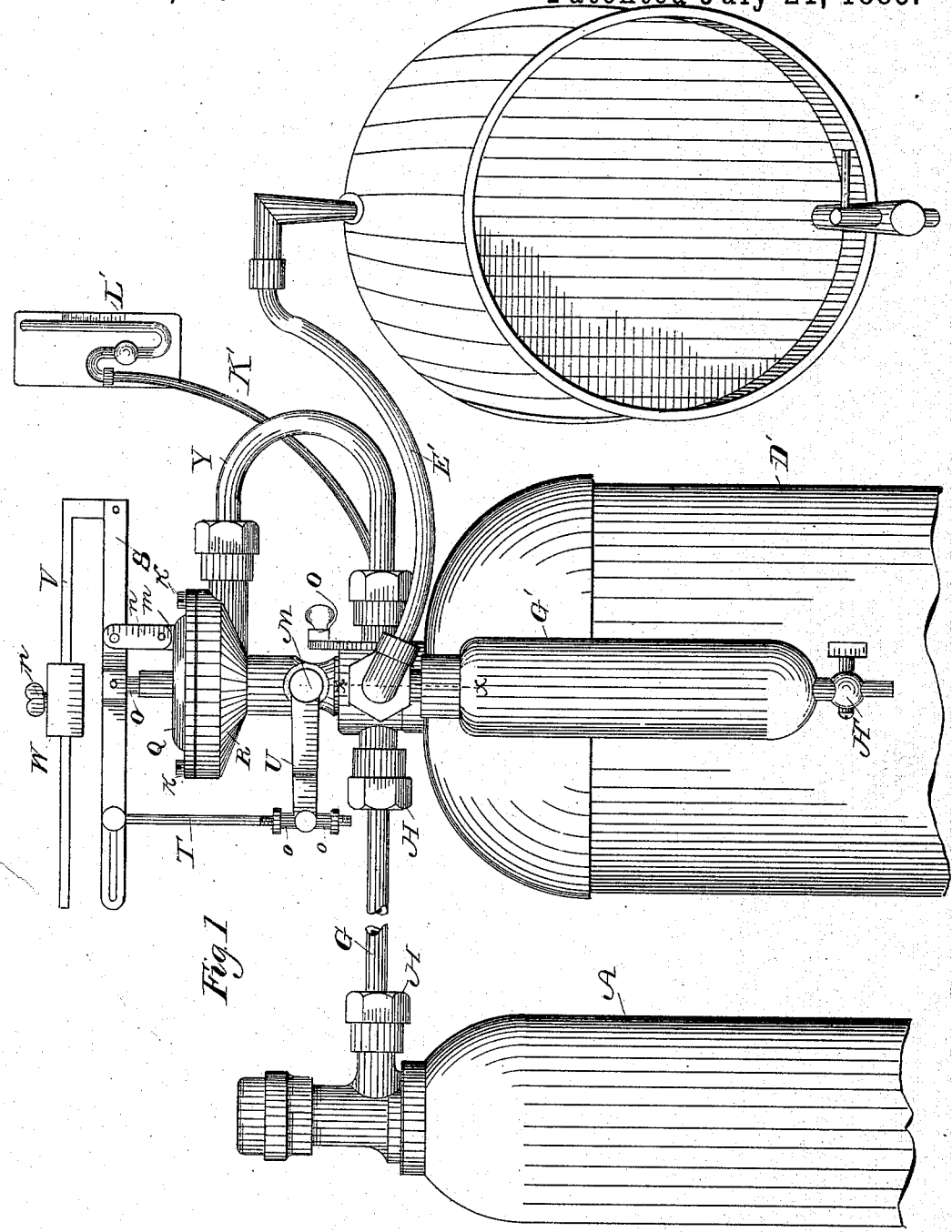

(No Model.) 3 Sheets—Sheet 1.

L. BAUMEISTER & C. A. BARTSCH.
APPARATUS FOR SUPPLYING AND REGULATING THE PRESSURE OF CARBONIC ACID GAS IN BEER KEGS.

No. 322,410. Patented July 21, 1885.

Witnesses
S. S. Williamson
W. J. Haviland

Inventor
Leopold Baumeister
Charles A. Bartsch
By Smith & Hubbard, Attys (No Model.) 3 Sheets—Sheet 2.
L. BAUMEISTER & C. A. BARTSCH.
APPARATUS FOR SUPPLYING AND REGULATING THE PRESSURE OF CARBONIC ACID GAS IN BEER KEGS.
No. 322,410. Patented July 21, 1885.
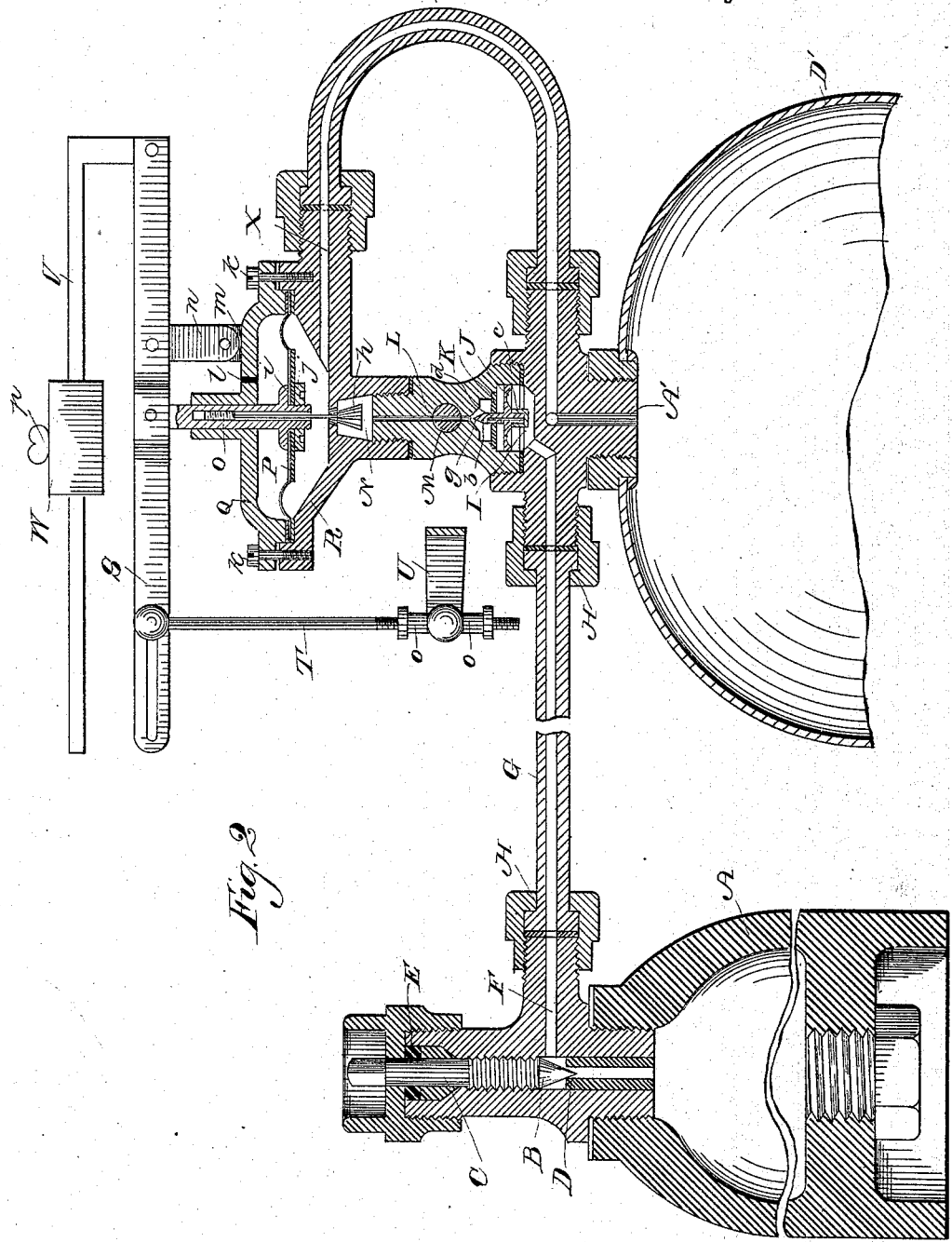
Witnesses
S. S. Williamson
W. J. Havlant
Inventor
Leopold Baumeister
Charles A. Bartsch
By Smith & Hubbard, Attys (No Model.) 3 Sheets—Sheet 3.
L. BAUMEISTER & C. A. BARTSCH.
APPARATUS FOR SUPPLYING AND REGULATING THE PRESSURE OF CARBONIC ACID GAS IN BEER KEGS.
No. 322,410. Patented July 21, 1885.
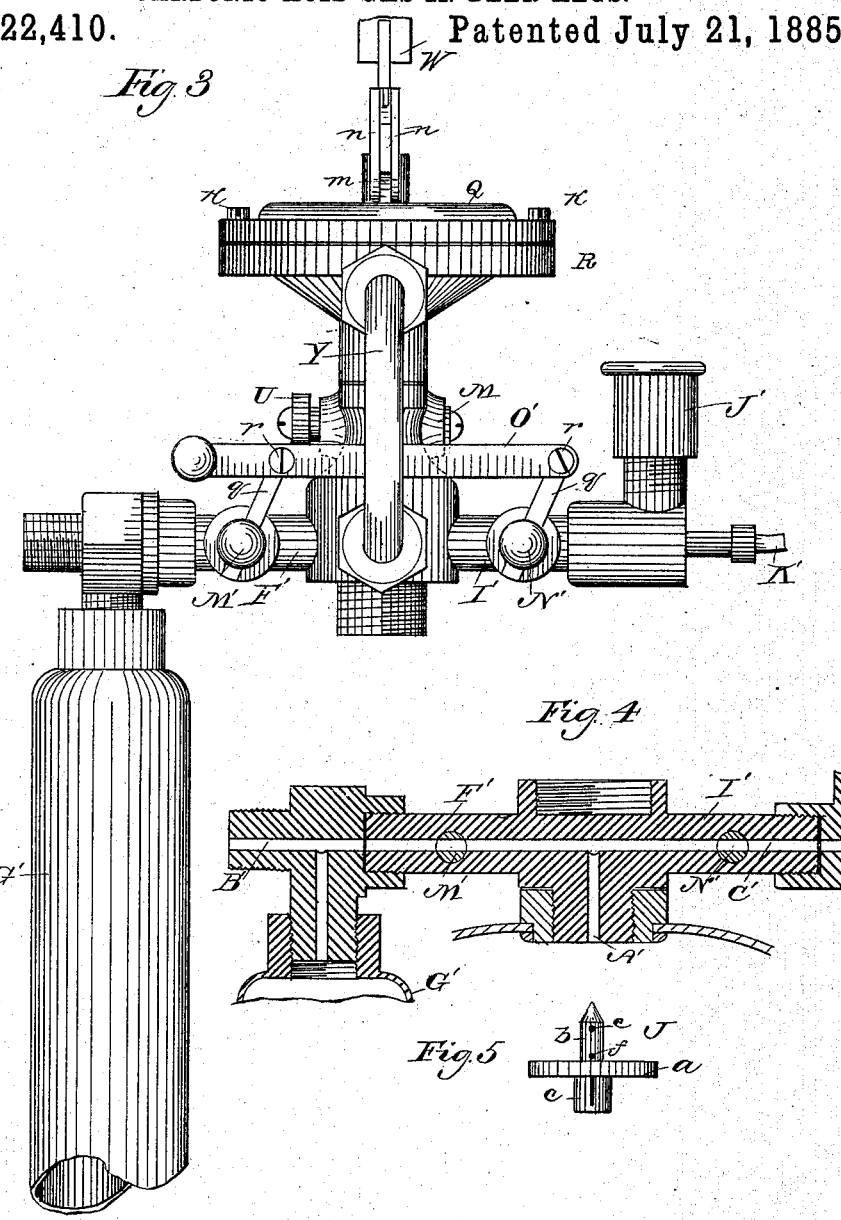

UNITED STATES PATENT OFFICE.

LEOPOLD BAUMEISTER AND CHARLES A. BARTSCH, OF BRIDGEPORT, CONN.

APPARATUS FOR SUPPLYING AND REGULATING THE PRESSURE OF CARBONIC-ACID GAS IN BEER-KEGS.

SPECIFICATION forming part of Letters Patent No. 322,410, dated July 21, 1885.

Application filed April 28, 1884. (No model.)

*To all whom it may concern:*

Be it known that we, LEOPOLD BAUMEISTER, a citizen of the Grand Duchy of Baden, Germany, and CHARLES A. BARTSCH, a citizen of the free town of Hamburg, Kingdom of Saxony, both residing at Bridgeport, in the county of Fairfield and State of Connecticut, have invented certain new and useful Improvements in Apparatus for Applying and Regulating Pressure Within Beer-Kegs; and we do hereby declare the following to be a full, clear, and exact description of the invention, such as will enable others skilled in the art to which it appertains to make and use the same.

Our invention relates to certain novel and useful improvements in the construction and application of apparatus for charging beer-kegs with carbonic-acid gas, and has for its object to regulate the supply of gas, so that there shall be a constant and uniform pressure on the beer within the keg, while at the same time the beer shall be preserved and kept cooled; and with these ends in view our invention consists in the details of construction hereinafter fully described, and then specifically designated by the claims.

In order that those skilled in the art to which our invention appertains may more fully understand its construction and operation, we will proceed to describe the same in detail, referring by letter to the accompanying drawings, forming a part of this specification, in which—

Figure 1 is a front elevation showing our improvement applied to a beer-keg.; Fig. 2, a central vertical section of the supply-bottle and our improved regulating apparatus; Fig. 3, a side elevation of said apparatus; Fig. 4, a detail elevation of the swimmer; and Fig. 5, a detail sectional view taken at the line *x x* of Fig. 1, the upper portion of the regulator and the lower portions of the equalizer and drain-cylinders being broken away.

Similar letters denote like parts in the several figures of the drawings.

A is the supply-bottle, which is constructed and charged with carbonic-acid gas in the usual manner.

B is a conical valve on the end of the threaded stem C, and D the valve-seat.

E is the packing, which is arranged around the stem above the thread.

The turning of the threaded stem will raise or lower the valve, as the case may be, and thereby regulate the initial flow of the gas.

F is a passage which leads from the bottle above the valve-seat and is continued to the regulator through rubber or other suitable tubing, G, which is coupled in any well-known manner to the supply-bottle and regulator at H. This passage enters chamber I at the bottom thereof, and in this chamber is what we term a "swimmer," J, (shown in detail elevation at Fig. 4,) which consists of a plunger or piston, *a*, adapted to fit snugly and move up and down in said chamber. Formed integral with this piston are extensions *b c*, through the center of which is a small passage, *d*, having two apertures, *e f*, one above and one below the partition K in the upper portion of chamber I. The extremity of the extension *b* forms a conical valve, *g*, which is adapted to close or open the passage L, which extends through the stop-cock M to the chamber N, in which is suspended a conical valve, *h*, by means of a small steel wire adjustably secured by screw-threads on its upper end to the internally-threaded stem O. Near the lower portion of stem O is formed a flange, *i*, between which and the nut *j* is confined a flexible diaphragm, P, the outer edges being secured air-tight between the cap Q and body R of the regulator by means of screw-bolts *k*. This diaphragm divides the chamber formed by said cap and body into two compartments, the lower of which contains the carbonic-acid gas, the upper being in direct communication with the outside air by means of opening *l* in the top of the cap Q, all for the purpose presently explained. The stem O passes up through the center of the cap, which is raised to form a guide for said stem. Secured to the top of the cap is a lug, *m*, to which are pivoted two plates, *n*. Between the upper ends of these plates is pivoted the balance-lever S, and to this lever is pivoted the upper end of stem O. Also, to this lever is adjustably secured a connecting-rod, T, which in turn is secured to the stop-cock lever U by means of jam-nuts *o*, which allow an adjustment of the stop-cock lever. To the rear end of the balance-lever S is secured an L-shaped arm, V, which is parallel with the lever S. On this arm slides a weight, W, which is held in any required position by set-screw $p$. From the lower compartment of the chamber formed by cap Q and body R the passage X extends and passes around through pipe Y, and back to the vertical center of the regulator just below the chamber I, where it meets the passages A', B', and C'. A' leads into the equalizing-reservoir D', formed of sheet metal, capable of sustaining a pressure of from three to five pounds to the square inch. The passage B' leads to the beer-keg through a suitable rubber tube, E'. Attached to the pipe F', forming passage B', is a depending cylinder, G', having a drain-cock, H', the use of which will be presently explained. Upon the outer end of pipe I', which forms passage C', is mounted a safety-valve, J', of ordinary construction. The passage C' is continued through a small rubber tube, K', to a pressure-gage, L'. In the pipes F' and I' are cocks M' N', adapted to open or close the passages B' C', as the case may be. The levers $q$ $q$ of these cocks are pivoted at $r$ $r$ to the operating-bar O', causing the said cocks to operate in unison.

From the foregoing description the operation of our improvement is obviously as follows: When the valve B has been opened sufficiently, by operating the screw the gas, which is under great pressure—say, one thousand pounds to the square inch—will flow through the passage F to the chamber I, and raise the swimmer J, which will cause the valve $g$ to seat, thereby preventing any passage of the gas from said chamber until a back-pressure is caused by the gas passing through the small passage $d$ in the extension $b$ $c$ into the compartment formed by the partition K and piston $a$, which will balance the piston and allow the gas to gradually escape through the aperture $f$ and passage L to the chamber N. From this chamber it flows into the lower compartment of the diaphragm-chamber, and around through the passage X to the vertical center of the regulator, as hereinbefore explained, and from thence into the equalizer D', pressure-gage L', and beer-keg. When the equalizer, keg, and diaphragm-chamber have been filled to the required pressure—say, five pounds to the inch—the diaphragm P will be raised, thereby carrying the stem O and causing the lever S to operate the stop-cock M through the medium of the connecting-rod T and lever U, and close the passage K, thus preventing any further flow of gas from the supply-bottle until the pressure in the diaphragm-chamber, equalizer, and keg has been reduced by drawing the beer from said keg, when the gravity of the weight W will cause the lever S to descend, thereby depressing the diaphragm, and at the same time the connecting-rod T, which will open the cock M and permit more gas to flow through the passage K under the diaphragm. The latter will then rise until an equilibrium is established between said gas and weight, when the cock will be again closed and the flow of gas from the bottle cut off.

When it is desirable to increase or diminish the pressure in the keg, it is only necessary to move the weight W backward or forward on the lever V, which will then require greater or less pressure on the diaphragm P to lift said weight. The pressure in the diaphragm-chamber, equalizer, and keg will at all times be indicated by the gage L', and if at any time from any cause the pressure in the above should increase beyond safety the safety-valve will at once relieve this excess.

In some cases, when a new keg of beer is connected to the regulator, the pressure in the keg is found to be greater than that in the equalizer, and in such cases the keg foams or primes, and the beer rises in the pipes, but is prevented from flowing into the regulator proper by the opening leading from passage B' into the cylinder G', before mentioned, from whence it is drawn off by the drain-cock H'. When it becomes necessary to shut off the flow of gas in moving and replacing the beer-kegs, or for other purposes, the bar O' is moved backward or forward, as the case may be, thereby closing both the cocks F' I'.

In practice we have found it advantageous to use the equalizer D', as the drawing of a glass of beer from the keg will not cause an immediate and severe action of the regulating mechanism, since the space thus left will be filled from the contents of the equalizer, whose capacity in comparison to the space occupied by the glass of beer is so large that the reduction of pressure will hardly influence the diaphragm, and the latter will by a slight and easy movement compensate for this slight reduction, as will be clearly understood; but the equalizer may be dispensed with, and a blind-cap screwed on in its place to close the passage A', and the regulator coupled directly to the supply-bottle.

Having thus fully described our invention, what we claim as new and useful is—

1. In apparatus for applying and regulating pressure within beer-kegs and the like, a diaphragm connected to a balance-lever adapted to operate a cock which regulates the flow of gas between the supply and keg, in combination with a swimmer having a piston adapted to be raised by the action of the high-pressure gas and a valve which regulates the escape of said gas from the swimmer-chamber to the diaphragm-chamber, substantially as specified.

2. In an apparatus as described, the diaphragm-chamber composed of two compartments separated by the diaphragm which actuates the balance-lever to open and close the cock for regulating the flow of gas between the supply and keg, said diaphragm having suspended therefrom the valve $h$, in combination with the swimmer composed of a piston and valve and having a central passage terminating in two openings, one above and the other below the partition K, for the purpose specified.

3. In an apparatus as described, a diaphragm connected to a balance-lever adapted to operate a cock for regulating the flow of gas between the supply and keg, in combination with a swimmer or secondary regulator composed of a valve and piston adapted to receive and modify the high-pressure gas before passing to the diaphragm, as described.

4. In an apparatus for applying and regulating pressure within beer-kegs, the body of the regulator having formed therein chambers I N, the former containing the swimmer-valve J, constructed as described, and the latter the valve $h$, suspended as set forth, in combination with the stem O, attached to the balance-lever S, cap Q, secured to the upper portion of the regulator and forming a chamber, air-tight diaphragm P, extending across said chamber, connecting-rod T, stop-cock M, lever U, and means for varying the resistance of the diaphragm, substantially as shown and specified.

5. The diaphragm which divides the chamber formed by the cap Q and body R into two compartments, in combination with the stem O, having arranged therein the threaded wire provided at its lower extremity with conically-shaped valve $h$, balance-lever S, arm V, having thereon sliding weight W, rod T, lever U, and cock M, substantially as set forth.

In testimony whereof we affix our signatures in presence of two witnesses.

LEOPOLD BAUMEISTER.
CHARLES A. BARTSCH.

Witnesses:
S. S. WILLIAMSON,
W. T. HAVILAND.